No. 730,066. PATENTED JUNE 2, 1903.
W. G. WILSON.
CHANGE AND REVERSING GEAR.
APPLICATION FILED APR. 1, 1901.
NO MODEL. 3 SHEETS—SHEET 1.
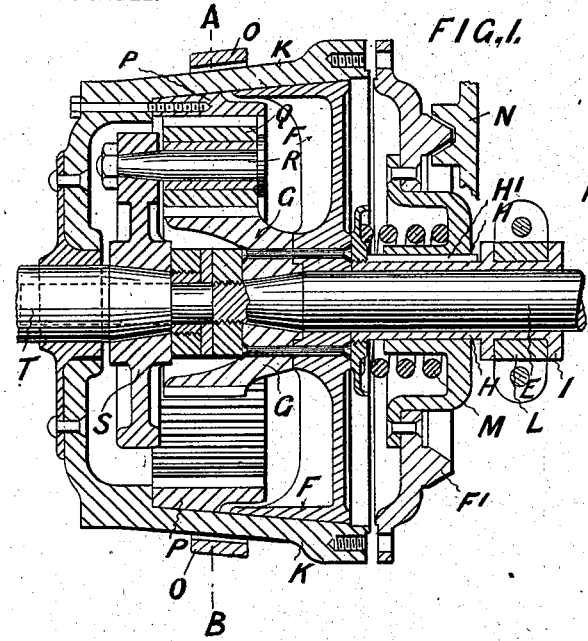
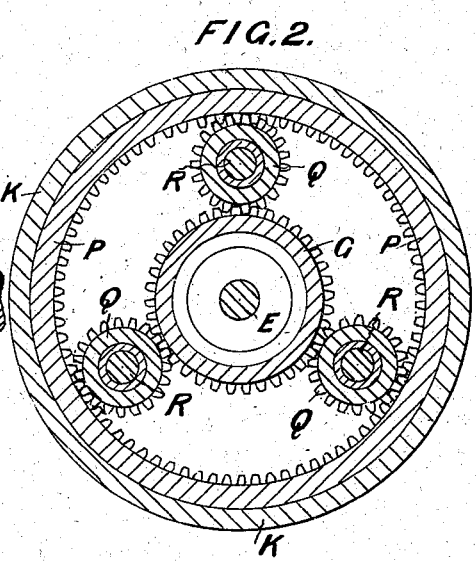
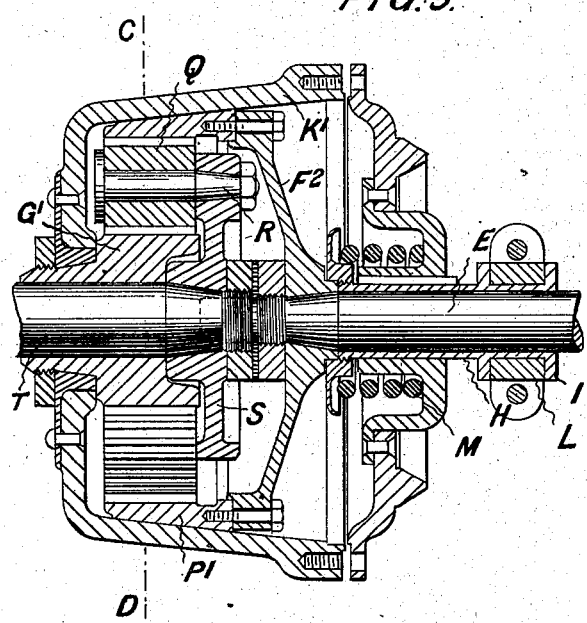
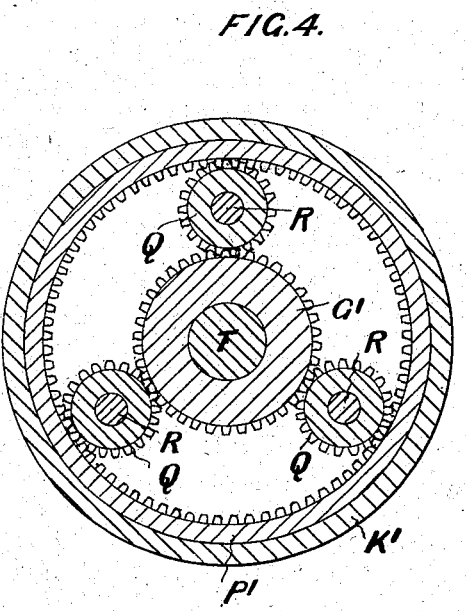
Inventor.
Walter Gordon Wilson No. 730,066. PATENTED JUNE 2, 1903.
W. G. WILSON.
CHANGE AND REVERSING GEAR.
APPLICATION FILED APR. 1, 1901.
NO MODEL. 3 SHEETS—SHEET 3.
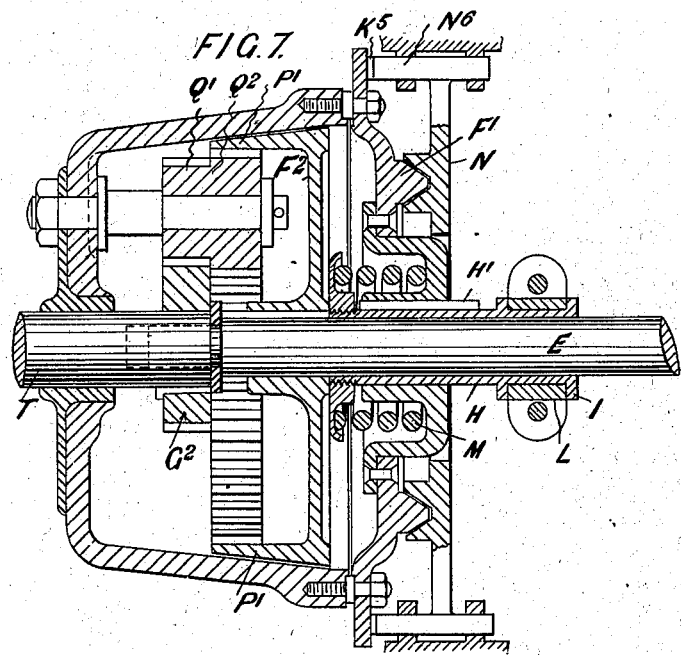
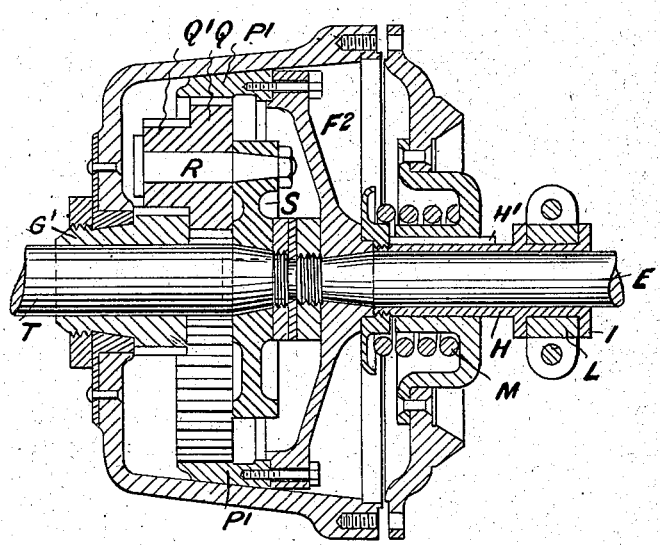

No. 730,066. Patented June 2, 1903.

UNITED STATES PATENT OFFICE.

WALTER GORDON WILSON, OF WESTMINSTER, ENGLAND.

CHANGE AND REVERSING GEAR.

SPECIFICATION forming part of Letters Patent No. 730,066, dated June 2, 1903.

Application filed April 1, 1901. Serial No. 53,926. (No model.)

*To all whom it may concern:*

Be it known that I, WALTER GORDON WILSON, engineer, a subject of the King of Great Britain, residing at No. 34 Great Peter street, in the city of Westminster, England, have invented new and useful Improvements in Change and Reversing Gears, of which the following is a specification.

This invention relates to change-gear or to change and reversing gear for reducing or increasing the velocity of the driven shaft, and is to enable the latter to be advantageously driven at two speeds in the same direction or, if desirable, upon changing the gear to cause a reversal of motion in the driven shaft.

According to my invention I provide two friction-clutches, acting upon an outer casing containing gearing. When one of these friction-clutches is in gear, the whole of the gearing is locked, so that the driven shaft is revolved in the same direction and at the same velocity as the driving-shaft. If this clutch be released and the other clutch be brought into gear, the aforesaid driven shaft rotates at a reduced or increased speed in the same direction or at an increased or equal or reduced speed in the opposite direction, according to the ratio of the aforesaid gearing.

Figure 5:
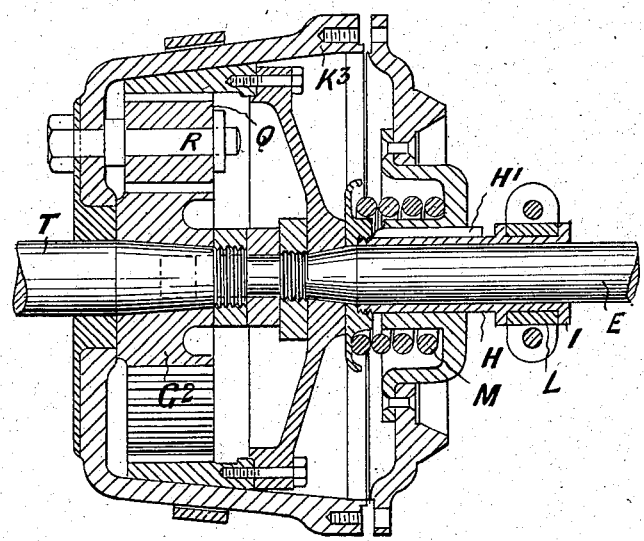
Figure 6:
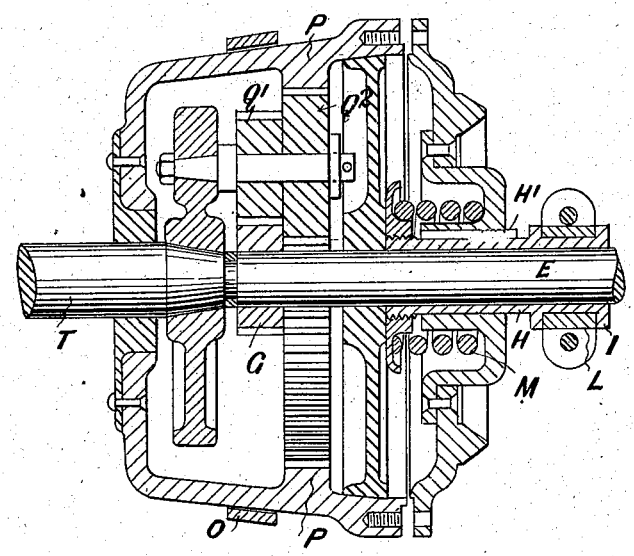

Figure 1 of the accompanying drawings represents a change-gear in sectional elevation, and Fig. 2 is a transverse section thereof on the line A B, Fig. 1. Fig. 3 is a sectional elevation of a modification, and Fig. 4 is a cross-section thereof on the line C D, Fig. 3. Fig. 5 represents in sectional elevation another slightly-modified construction. Fig. 6 is a similar view of another modification. Fig. 7 is a sectional elevation of another modified form of gearing, and Fig. 8 is a similar view of yet another modification.

I will now proceed to describe my invention with reference to Figs. 1 and 2. On the driving-shaft E there is rigidly attached what is hereinafter called the "friction-wheel" F and a pinion G. There is also a sleeve H, with a flange I, loosely mounted on the said shaft E, and mounted on the sleeve is a casing K, forming an internal cone and made in two parts, bolted together in the manner shown for convenience of manufacture; but I may make it of more than two parts, if desired. The casing K may also, if desired, form an external cone for a reason to be described later on. It is so mounted on the said sleeve H as to be free to move laterally but not circumferentially thereon—for instance, by means of a feather H' and feather-way—and the sleeve is mounted in a fixed bearing L, which allows it free revolution, but prevents any lateral movement by reason of the flanges on the sleeve on each side of the bearing. There is a spring M or the like which tends to cause the casing K to engage with the friction-wheel F. The casing is provided with a friction-ring F', with which a friction-ring a brake-ring N, operated in any convenient manner, is arranged to engage at will to cause the stoppage of the revolution of the casing K, and, if desired, there may be a fixed brake-ring O, with which the external cone of the casing is made to engage as it moves by reason of the movement communicated to it by the brake-ring N. The casing K is also provided with an internal toothed wheel P, which gears with a pinion, or, as in the construction shown, with three pinions Q, mounted on short shafts R or arms fixed to a wheel or framework S, keyed to the driven shaft T, the said pinions Q forming planet-wheels, which also gear with the pinion G, mounted on the driving-shaft E.

According to a modification instead of providing the casing K with the internal tooth-wheel P, as shown in Figs. 1 and 2, the friction-wheel $F^2$ may, as shown in Figs. 3 and 4, be provided with the internal tooth-wheel P', and then the casing K' will have mounted therein and attached thereto the pinion G', which in the previous construction (designated by the letter G) was described and shown attached rigidly to the driving-shaft E. As before, the pinions or planet-wheels Q are mounted on studs R, fixed to the frame or wheel S, fixedly mounted on the driven shaft T, or, as shown in Fig. 5, the pinions Q may be mounted on studs R, fixed to the casing $K^3$ instead of to a separate wheel or frame, and the pinion $G^3$ is keyed to the driven shaft T.

According to yet another modification instead of the planet-wheels being each single wheels they may, as shown in Fig. 6, be made practically to form two wheels $Q'\,Q^2$ of different diameters, the result of which will be that the pinion G on the shaft E will gear with the part Q' of the differential planet-wheels and the other part Q² of each of the said differential planet-wheels will gear with an internal toothed wheel P, attached to the casing K, as shown.

In Fig. 7 the construction is very similar except that the internal tooth-wheel P' is, as also shown at Fig. 3, attached to or made in one with the friction-wheel F² and, further, the differential pinions Q' Q² are mounted on studs fixed in the casing, while the pinion G², keyed to the shaft T, gears with the pinion or pinions Q', or, as shown in Fig. 8, the internal toothed wheel P' is made in one with the friction-wheel F², which is fast on the shaft E. The casing K' has fixed thereto or made in one therewith a spur gear-wheel G', which gears with the pulley Q', made in one with or attached to the pinion Q, which gears with the internal wheel P', the differential pulleys Q and Q' being mounted on counter-shafts R, fixed to the frame or disk S, attached to the shaft T.

In all cases in order to assist the brake N on the casing when the latter is to be stopped or to render it possible to expend less power for that purpose I provide a ratchet-tooth or a number of ratchet-teeth K⁵ on the casing, and the brake-ring N has a pawl or pawls N⁶, or I provide, as shown in Fig. 1, an external coned brake-ring O or other suitable device to prevent the revolution of the casing when the brake N has been put on, or more than two means for holding the casing at rest may be employed at the same time.

What I claim as my invention, and desire to secure by Letters Patent, is—

1. Change-gear comprising a driving-shaft, a driven shaft a friction-wheel mounted on one of the said shafts, a sleeve loose on one of the said shafts, an outer casing axially movable along the sleeve and adapted to engage with and to be disengaged from the said friction-wheel, means for causing the said casing to engage with and to be disengaged from the said friction-wheel an internal toothed wheel within the said casing, a pinion within the said casing and concentric therewith, a counter-shaft or counter-shafts mounted within the casing and pinions on said counter-shaft or counter-shafts meshing with the said internal toothed wheel and the pinion meshing with said internal toothed wheel and pinion concentric with the casing, to transmit motion from the driving-shaft to the driven shaft substantially as and for the purposes set forth.

2. Change-gear comprising a driving-shaft, a driven shaft in line with the said driving-shaft, a friction-wheel mounted on the said driving-shaft, a sleeve loose on the said driving-shaft, a coned outer casing adapted to revolve with the said sleeve, to move thereon in the direction of their common axis and to engage with and to be disengaged from the said friction-wheel, means for causing the said casing to engage with and to be disengaged from the said friction-wheel, an internal toothed wheel fixed to and within the said casing, a pinion mounted on the end of the driving-shaft, a counter-shaft or counter-shafts fixed on and eccentric to the driven shaft within the casing and pinions mounted on said counter-shaft or counter-shafts meshing with the said internal toothed wheel and the pinion on the driving-shaft substantially as set forth.

3. Change-gear comprising a driving and a driven shaft, a friction-wheel mounted on the driving-shaft, a sleeve loose on the driving-shaft, a coned outer casing revoluble with and axially movable on the sleeve to engage with and be disengaged from the friction-wheel, means to cause the casing and friction-wheel to be normally in engagement, a friction element outside the casing and a second friction element engaging the casing, to move it axially to disengage the friction-wheel and engage the first-mentioned friction element and gearing connecting the two shafts to drive the driven shaft, substantially as set forth.

4. Change-gear comprising a driving and a driven shaft, a friction-wheel secured to and a sleeve loose on the driving-shaft, a conical outer casing having external and internal friction-surfaces and an internal toothed rim, revoluble with and axially movable on the sleeve, a pinion and friction-wheel mounted on the driving-shaft, planet-gears secured to the driven shaft and meshing with both the toothed rim and the pinion, an external stationary friction element and a movable one, the latter to engage the casing to move into engagement with the former and simultaneously disengage the casing and friction-wheel, substantially as set forth.

5. Change-gear comprising a driving-shaft, a driven shaft in line with the said driving-shaft, a friction-wheel mounted on the said driving-shaft, a sleeve loose on the said driving-shaft, a coned outer casing adapted to revolve with the said sleeve, to move thereon in the direction of their common axis and to engage with and to be disengaged from the said friction-wheel, means for causing the said casing to engage with and to be disengaged from the said friction-wheel, an internal toothed wheel fixed to and within the said casing, a pinion mounted on the driving-shaft, a counter-shaft or counter-shafts mounted eccentrically on the driven shaft within the casing and differential pinions mounted on the said counter-shaft or counter-shafts meshing respectively with the internal toothed wheel and the pinion on the driving-shaft substantially as set forth.

In testimony whereof I have signed my name to this specification in the presence of two subscribing witnesses.

WALTER GORDON WILSON.

Witnesses:
V. JENSEN,
WALTER J. SKERTEN.